July 28, 1959 R. J. BUSH 2,896,974
BELL AND SPIGOT JOINT WITH PLURAL FLEXIBLE LIP TYPE SEAL
Filed April 2, 1957

INVENTOR.
Russell J. Bush
BY
His Attorney

United States Patent Office 2,896,974
Patented July 28, 1959

2,896,974

BELL AND SPIGOT JOINT WITH PLURAL FLEXIBLE LIP TYPE SEAL

Russell J. Bush, Dayton, Ohio, assignor to General Motors Corporation, Detroit, Mich., a corporation of Delaware Application April 2, 1957, Serial No. 650,222

1 Claim. (Cl. 285—110)

This invention relates to pipe joints and more particularly to improvements in seals for sealing bell and spigot type pipe joints.

Related subject matter is disclosed in the U.S. application S.N. 573,248, assigned to the assignee of the present invention.

In the installation of tile or piping for the conveyance of sewage, industrial waste, storm water and the like, it is common practice to use pipe sections made of clay or similar material which are provided with bell and spigot type joints. These tile installations generally involve relatively low pressures of up to about 10 ft. of waterhead. The time honored methods of sealing the pipe joints by caulking with hemp or oakum and then sealing the joint with lead or other material is more than adequate for the purpose but is time consuming and expensive. In recent years, a variety of unitary elastomeric type seals have been proposed which are inserted between the bell and spigot to effect a seal. However, as a practical matter, a satisfactory design of the latter type of seal is complicated by the fact that the tile of the type referred to is generally manufactured under conditions whereby the diameter of the spigot and bell may vary considerably within a given pipe size. Thus for example, manufacturing specifications generally call for a tolerance of for example, plus or minus ½ inch on the pipe diameter for a nominal 6 inch pipe diameter, and the commercial product actually varies within these tolerances. Moreover since in the process of firing the tile in an oven, the tile sections are generally stacked one on another, many of the commercial pipe sections may be an elliptical rather than a cylindrical shape. It is highly desirable, if not essential, to have available a single size seal element for a given nominal size pipe which will provide a satisfactory seal and satisfy the requirements of the various municipal sanitation codes, regardless of the above mentioned variations within a given pipe size.

It is accordingly among the objects of this invention to provide a unitary seal element which may be readily inserted between a bell and spigot to effect a satisfactory seal in spite of the pipe size variation and imperfections which may occur within a given commercial pipe size. This and other objects are accomplished by providing an elastomeric sealing element having an axially elongated, substantially cylindrical main body portion which is inserted in spaced relation between the bell and spigot of the pipe joint, and which is provided with ribs or sealing lip supporting members integrally attached to the inner and outer axial surfaces of the main body member and extending into compressible sealing engagement with the bell and spigot surface. The ribs or sealing lip supporting members are formed to have an inclined conical cross-sectional figuration, and the uppermost or top portions thereof are curved in a direction opposite a direction of the lip incline and terminate in a relatively sharp point. When installed between a pipe and a spigot, an end of the main body portion is preferably seated adjacent the base of the bell, and the ribs are bent axially and radially toward the main body member of the bell so that the maximum point of contact or sealing pressure between the joint walls of the seal element occurs at the pointed and curved portions of the uppermost or sealing lip portions of the rib. The main body portion is made of a sufficient radial thickness so that it is not appreciably distorted in an installed position and the ribs are of sufficient radial thickness so that they are not forced back into engagement with the main body member in an installed position, and the spigot is resiliently supported within the bell solely by the ribs.

Further objects and advantages of the present invention will be apparent from the following description, reference being had to the accompanying drawings wherein a preferred embodiment of the present invention is clearly shown.

Figure 1:
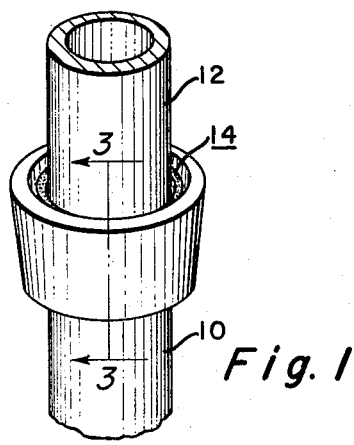
Figure 1 is a bell and spigot joint sealed by an elastomeric seal element involved in the present invention.

A specific embodiment will now be described in relation to the drawings of which Figure 1 illustrates a bell mouthed pipe section 10 and a mating pipe section 12 assembled to form a joint sealed by an elastomeric seal element 14.

Figure 2:
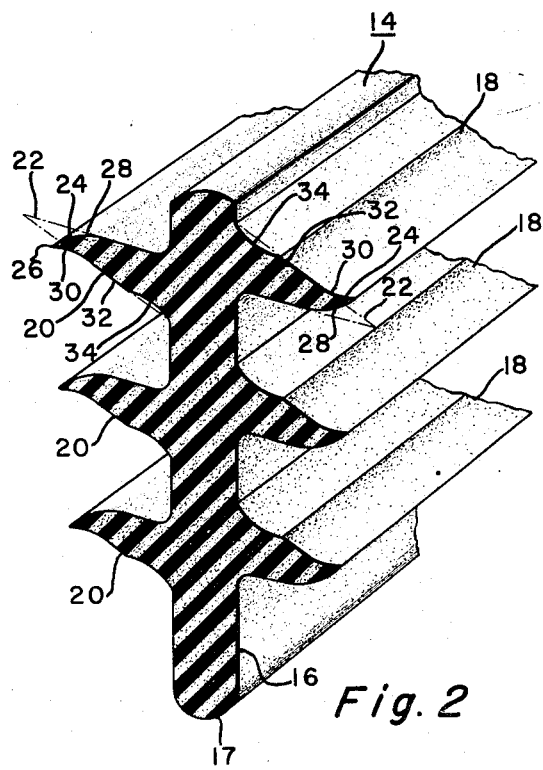
Figure 2 is a fragmentary view of a seal element embodying the present invention.

For purposes of clarity, a segment of the seal element 14 is shown in its free state in Figure 2 in the form of which it may be extruded in strip form. The segment will be described as constituting a portion of an annular seal element. It consists of an annular axially elongated main body portion 16 having a plurality of annular ribs or sealing lip supporting portions 18 integrally attached to the inner axial side of the main body portion 16 in spaced relation, and a plurality of annular ribs or sealing lip portions 20 integrally attached to the outer axial side of the main body portion 16 in spaced relation.

Each lip 18 and 20 is formed to have an inclined cross-sectional figuration as is indicated by the dotted lines 22. The uppermost or top portions 24 or the lips are curved in a direction opposite the direction of incline and terminate in pointed portions 26. The sides 28 of the uppermost portions 24 in the direction of the incline is formed to have a convex configuration, preferably in the form of an arc of a circle. The side 30 of the uppermost portion 24 in the direction opposite the direction of incline is formed to have a concave surface, preferably in the form of an arc of a circle.

Figure 3:
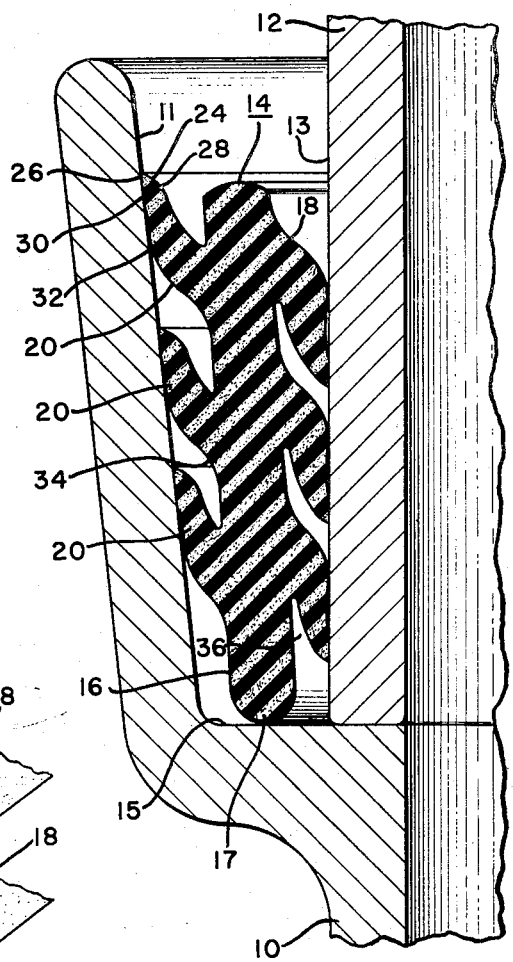
Figure 3 is a cross-sectional view taken along line 3—3 of Figure 1.

Figure 3 shows the seal element 14 installed between the inner axial wall 11 of the bell and the outer axial wall 13 of the mating pipe end or spigot. The ribs 18 and 20 are compressibly bent in the direction of their incline so that substantially only the concave portions 30 of the uppermost portions 24 of the ribs fully engage the bell and spigot walls and the spigot is thusly resiliently supported within the bell. The intermediate portions 32 of the ribs may be in close proximity to the bell and spigot walls and may actually engage the walls provided that the major contact or sealing pressure is situated in the portions 32 of the ribs. It will be observed that the curved end points figuration of the uppermost portions of the ribs insure that when the ribs are bent in the direction of their incline the pointed portions 24 of the ribs are caused to engage the pipe and spigot walls under conditions of maximum pressure and are backed up by a considerable mass of elastomeric material under compression to form an efficient sealing contact. It is essential to the invention that the ribs in an installed position are not bent in the direction of their incline to an extent so that the sides of the ribs engage the main body portion 16 to insure that the spigot is resiliently supported within the bell by the lips of the seal element.

To insure that the intermediate portions 32 of the ribs do not engage the bell and spigot walls with any substantial degree of pressure, the lower portions of the ribs are provided with a shallow annular groove 34 preferably in the form of an arc of a circle, extending over approximately the lower half of each rib on the sides opposite of the direction of incline. These grooves have the effect of reducing the degree to which the intermediate portions 32 of the ribs are caused to bulge in the direction of the bell and spigot walls and thereby of insuring that the intermediate portions 32 do not substantially relieve the sealing lip portions 30 of pressure and impair the efficiency of the seal.

The seal element 14 of the present invention is particularly useful in connection with relatively small sized tile as for example, 4 or 6 inch tile, although it may satisfactorily be used with larger size tile. Seal elements of a suitable size for sealing 4 and 6 inch tile have been found to satisfactorily seal against pressures up to about 16 ft. of waterhead. The seal elements have been found to function efficiently when inclined from 15 to 30 degrees from a plane normal to the longitudinal axis of the main body portion 16 and the ribs are made of a sufficient thickness to resiliently support the spigot within the bell without engaging the main body portion 16 of the seal element. The main body portion 16 is made of sufficient radial thickness to prevent appreciable distortion thereof in an installed position due to the pressure of the ribs thereagainst and consequently improper positioning of the ribs. It has been found that if the radial height or thickness of the ribs are greater than the radial ribs 16 of the seal element, the seal dimension for a given size pipe will seal satisfactorily pipe sizes within tolerances of plus or minus ½ inch on the diameter.

The main body portion 16 of the seal is preferably provided with an axially extended portion 17 which is preferably disposed adjacent the base 15 of the bell as shown in Figure 3 which aids in properly locating the seal element within the bell. In the embodiments shown in Figure 3, the outer ribs 20 are inclined away from the base 15 of the bell, and the inner ribs 18 are inclined toward the base of the bell. This arrangement is satisfactory for sealing against pressures up to 16 ft. of waterhead. The arrangement enables the seal element to be readily inserted into the bell and thereafter enables the mating pipe end to be readily inserted into the opening centrally of the ribs 18 as shown, since in each instance the element being inserted is moved relatively in the direction of the lip incline.

When the bell is somewhat frusto-conical in shape as shown in Figure 3, the ribs 18 and 20 are preferably made progressively of greater radial height or thickness to correspond to the increasing diameter of the seal. It is not necessary to make the main body portion 16 of frusto-conical shape since this member will distort slightly to conform to the geometric configuration of the space between the bell and spigot and "float" therein without impairing the effectiveness of the seal. However it is obvious that if the space between the bell and the spigot is markedly frusto-conical, the main body member 16 is desirably made similarly frusto-conical.

The present seal element may also be adapted for sealing against substantially higher pipe pressures by having both the inner and outer ribs 18 and 20 respectively inclined in the direction of the bell base 15. With this arrangement the pipe pressure will be exerted against the walls of the spaces 36 of each rib as indicated in Figure 3, to force the seal lip portions of the ribs into tighter engagement with the bell and spigot walls.

The seal element may be first extruded in strip form and then formed into a unitary annular member by any suitable means or directly molded into an annular member, as for example is described in connection with the above mentioned application S.N. 573,248. Moreover the seal element may be beneficially cemented into place by suitable cement as is described in the latter application.

Where the seal element is made by extruding an elastomeric mass in strip form which is thereafter formed into the annular seal member the outer ribs of the seal member tend to have a somewhat greater incline and the inner ribs a somewhat lesser incline in their annular free state than in the extruding strip state. However these minor differences in inclination do not reduce the effectiveness of the seal.

By the term "elastomeric" as used herein is meant any elastomeric rubber-like material such as natural rubber, butadiene-styrene copolmer, butadiene-acrylonitrile copolymer, polychloroprene, mixtures of these materials and other similar rubber-like materials.

While the embodiments of the present invention as herein disclosed constitute a preferred form, it is understood that other forms may be adopted.

What is claimed is as follows:

The combination, comprising, a bell-mouthed sewer-tile pipe section including a base and an inner axial wall, a mating spigot sewer-tile pipe section located in substantially concentric relation thereto including an outer axial wall, both said inner and outer axial walls having surfaces subject to appreciable dimensional variation and imperfections, and an elastomeric annular seal therebetween, including, an axially elongated and substantially cylindrical main body portion inserted in spaced relation between the inner and outer wall surfaces and having one end portion adjacent to the base of the bell-mouthed section, a plurality of substantially duplicate annular inner and outer ribs each of uniform circumferential cross section and including a base portion integrally attached to said cylindrical main body portion on opposite sides thereof substantially opposite each other, each rib in a free state being inclined and having a substantially triangular cross sectional configuration, said configuration being defined by an annular fillet at the jointure of said rib with said main body portion on the side of said rib in the direction of incline, a first straight side portion joined at one end to said fillet and extending from said fillet away from said main body portion for a major portion of the radial height of said rib, a convexly curved portion joined at one end to the other end of said first straight side portion, a first concavely curved portion joined at one end to the other end of said convexly curved portion and extending toward said main body portion, a second straight side portion joined at one end to the other end of said concavely curved portion and extending toward said main body portion, and a second concavely curved portion joined at one end to the other end of said second straight side portion, and at the other end to said main body portion, the chordal length of said second concavely curved portion being substantially equal to the length of said second straight side portion, said convexly curved portion and said first concavely curved portion forming therebetween a feather edged tip extending opposite the direction of rib incline, said tip being the only portion of said rib not falling within the limits of said substantially triangular configuration, the radial height of each rib in a free state being greater than the radial thickness of said main body portion, the axial thickness of each rib being less than its radial height, each rib being spaced from the others an axial distance greater than the axial thickness thereof, said inner ribs being inclined in a direction opposite the direction of inclination of said outer ribs, said seal being deflected from its free state with each rib bent in the direction of its incline into contact with a corresponding axial wall with substantially the entire surface of each rib from the feather edged tip thereof to the line of juncture between the second straight side portion and the second concavely curved portion lying substantially along said corresponding axial wall, the points of maximum sealing contact for each rib being established at the points of contact of said feather edged tip and said line of juncture with said corresponding axial wall, with the first straight portion and the convex portion of each rib radially spaced from both the main body portion and the adjacent rib.

References Cited in the file of this patent

UNITED STATES PATENTS

| | | |
|---|---|---|
| 2,032,492 | Nathan | Mar. 3, 1936 |
| 2,259,940 | Nathan | Oct. 21, 1941 |
| 2,271,777 | Nathan | Feb. 3, 1942 |
| 2,314,386 | Brend | Mar. 23, 1943 |
| 2,396,491 | Chamberlain | Mar. 12, 1946 |